United States Patent
Hecht et al.

(10) Patent No.: US 7,901,291 B2
(45) Date of Patent: Mar. 8, 2011

(54) GAMING DEVICE OPERABLE WITH PLATFORM INDEPENDENT CODE AND METHOD

(75) Inventors: William L. Hecht, Reno, NV (US); Aaron T. Jones, Reno, NV (US)

(73) Assignee: IGT, Reno, NV (US)

( * ) Notice: Subject to any disclaimer, the term of this patent is extended or adjusted under 35 U.S.C. 154(b) by 1703 days.

(21) Appl. No.: 10/255,380

(22) Filed: Sep. 26, 2002

(65) Prior Publication Data

US 2003/0064808 A1 Apr. 3, 2003

Related U.S. Application Data

(60) Provisional application No. 60/325,974, filed on Sep. 28, 2001.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............. 463/42; 463/30; 463/31; 463/35; 463/43; 463/44

(58) Field of Classification Search ............... 463/30, 463/31, 35, 42–44; 717/147; 703/21, 23
See application file for complete search history.

(56) References Cited

U.S. PATENT DOCUMENTS

| | | |
|---|---|---|
| 3,831,172 A | 8/1974 | Olliges et al. |
| 4,300,225 A | 11/1981 | Lambl |
| 4,314,236 A | 2/1982 | Mayer et al. |
| 4,339,798 A | 7/1982 | Hedges et al. |
| 4,344,345 A | 8/1982 | Sano |
| 4,363,482 A | 12/1982 | Goldfarb |
| RE31,441 E | 11/1983 | Nutting et al. |
| 4,496,149 A | 1/1985 | Schwartzberg |
| 4,582,324 A | 4/1986 | Koza et al. |
| 4,618,150 A | 10/1986 | Kimura |
| 4,624,459 A | 11/1986 | Kaufman |
| 4,660,107 A | 4/1987 | Chippendale, Jr. |

(Continued)

FOREIGN PATENT DOCUMENTS

CA 2358237 A1 * 4/2002

(Continued)

OTHER PUBLICATIONS

Article, "A Salute to Game Shows-The Price Is Right-Pricing Games-Three Strikes," p. 8 of 9, online, retrieved on Aug. 16, 2000. Retrieved from the Internet: <http://ben-schumin.simplenet.com/game-shows/.shows/price-is-right/pricing-games-4.htm>.

(Continued)

*Primary Examiner* — John M Hotaling, II
*Assistant Examiner* — Adetokunbo Torimiro
(74) *Attorney, Agent, or Firm* — K&L Gates LLP

(57) ABSTRACT

A wagering gaming device which includes at least one converter program. The gaming device processor, which operates on a particular platform, can use the converter program to read and use programs otherwise incompatible with such platform, such as platform independent programs. This type of gaming device enables developers to develop code on platforms which are different in type from the gaming device platform, and the gaming device processor can read and use this code to operate the gaming device.

25 Claims, 10 Drawing Sheets

U.S. PATENT DOCUMENTS

| | | | |
|---|---|---|---|
| 4,695,053 A | 9/1987 | Vazquez, Jr. et al. | |
| 4,712,189 A | 12/1987 | Mohri | |
| 4,732,386 A | 3/1988 | Rayfiel | |
| 4,733,593 A | 3/1988 | Rothbart | |
| 4,791,558 A | 12/1988 | Chaitin et al. | |
| 4,876,937 A | 10/1989 | Suzuki | |
| 4,961,575 A | 10/1990 | Perry | |
| 4,974,483 A | 12/1990 | Luzzatto | |
| 4,974,857 A | 12/1990 | Beall et al. | |
| 5,046,735 A * | 9/1991 | Hamano et al. | 434/129 |
| 5,096,195 A | 3/1992 | Gimmon | |
| 5,119,465 A | 6/1992 | Jack | |
| 5,179,517 A | 1/1993 | Sarbin et al. | |
| 5,221,801 A | 6/1993 | Bruti et al. | |
| 5,223,828 A | 6/1993 | McKiel, Jr. | |
| 5,242,163 A | 9/1993 | Fulton | |
| 5,258,574 A | 11/1993 | Kawano | |
| 5,266,736 A | 11/1993 | Saito | |
| 5,275,400 A | 1/1994 | Weingardt et al. | |
| 5,287,102 A | 2/1994 | McKiel, Jr. | |
| 5,331,112 A | 7/1994 | Sato et al. | |
| 5,342,047 A | 8/1994 | Heidel et al. | |
| 5,371,345 A | 12/1994 | LeStrange et al. | |
| 5,390,938 A | 2/1995 | Takeya | |
| 5,393,061 A | 2/1995 | Manship et al. | |
| 5,393,070 A | 2/1995 | Best | |
| 5,429,507 A | 7/1995 | Kaplan | |
| 5,429,513 A | 7/1995 | Diaz-Plaza | |
| 5,430,835 A | 7/1995 | Williams et al. | |
| 5,446,902 A | 8/1995 | Islam | |
| 5,449,173 A | 9/1995 | Thomas et al. | |
| 5,469,511 A | 11/1995 | Lewis et al. | |
| 5,470,233 A | 11/1995 | Fruchterman et al. | |
| 5,472,197 A | 12/1995 | Gwiasda et al. | |
| 5,508,699 A | 4/1996 | Silverman | |
| 5,515,764 A | 5/1996 | Rosen | |
| 5,577,253 A | 11/1996 | Blickstein | |
| 5,606,144 A | 2/1997 | Dabby | |
| 5,611,535 A | 3/1997 | Tiberio | |
| 5,625,845 A | 4/1997 | Allran | |
| 5,630,754 A | 5/1997 | Rebane | |
| 5,655,961 A | 8/1997 | Acres et al. | |
| 5,668,996 A | 9/1997 | Radinsky | |
| 5,695,188 A | 12/1997 | Ishibashi | |
| 5,697,843 A | 12/1997 | Manship et al. | |
| 5,702,304 A | 12/1997 | Acres et al. | |
| 5,703,310 A | 12/1997 | Kurakake et al. | |
| 5,707,286 A | 1/1998 | Carlson | |
| 5,715,459 A | 2/1998 | Celi | |
| 5,741,183 A | 4/1998 | Acres et al. | |
| 5,745,761 A | 4/1998 | Celi | |
| 5,745,762 A | 4/1998 | Celi | |
| 5,752,882 A | 5/1998 | Acres et al. | |
| 5,758,875 A | 6/1998 | Giacalone, Jr. | |
| 5,762,552 A | 6/1998 | Vuong et al. | |
| 5,766,074 A | 6/1998 | Cannon et al. | |
| 5,769,716 A | 6/1998 | Saffari et al. | |
| 5,772,509 A | 6/1998 | Weiss | |
| 5,778,231 A | 7/1998 | Van Hoff | |
| 5,792,972 A | 8/1998 | Houston | |
| 5,802,364 A | 9/1998 | Senator | |
| 5,807,172 A | 9/1998 | Piechowiak | |
| 5,809,303 A | 9/1998 | Senator | |
| 5,812,688 A | 9/1998 | Gibson | |
| 5,820,459 A | 10/1998 | Acres et al. | |
| 5,823,873 A | 10/1998 | Moody | |
| 5,833,538 A | 11/1998 | Weiss | |
| 5,836,817 A | 11/1998 | Acres et al. | |
| 5,839,958 A | 11/1998 | Ozarow | |
| 5,848,932 A | 12/1998 | Adams | |
| 5,854,927 A | 12/1998 | Gelissen | |
| 5,876,284 A | 3/1999 | Acres et al. | |
| 5,880,386 A | 3/1999 | Wachi et al. | |
| 5,889,990 A | 3/1999 | Coleman | |
| 5,892,171 A | 4/1999 | Ide | |
| 5,902,184 A | 5/1999 | Bennett et al. | |
| 5,908,354 A | 6/1999 | Okuniewicz | |
| 5,910,048 A | 6/1999 | Feinberg | |
| 5,911,071 A | 6/1999 | Jordan | |
| 5,920,720 A | 7/1999 | Toutonghi | |
| 5,920,842 A | 7/1999 | Cooper et al. | |
| 5,923,878 A | 7/1999 | Marsland | |
| 5,923,880 A | 7/1999 | Rose | |
| 5,930,509 A | 7/1999 | Yates | |
| 5,937,193 A | 8/1999 | Evoy | |
| 5,946,487 A * | 8/1999 | Dangelo | 717/148 |
| 5,946,489 A | 8/1999 | Yellin | |
| 5,951,397 A | 9/1999 | Dickinson | |
| 5,964,843 A | 10/1999 | Eisler | |
| 5,966,535 A | 10/1999 | Benedikt | |
| 5,967,894 A | 10/1999 | Kinoshita et al. | |
| 5,970,249 A | 10/1999 | Holze | |
| 5,978,585 A | 11/1999 | Crelier | |
| 5,980,384 A | 11/1999 | Barrie | |
| 5,997,401 A | 12/1999 | Crawford | |
| 5,999,731 A | 12/1999 | Yellin | |
| 6,003,038 A | 12/1999 | Chen | |
| 6,015,346 A | 1/2000 | Bennett | |
| D421,277 S | 2/2000 | McGahn et al. | |
| 6,021,272 A | 2/2000 | Cahill | |
| 6,021,273 A | 2/2000 | Griesemer | |
| 6,026,238 A | 2/2000 | Bond | |
| 6,027,115 A | 2/2000 | Griswold et al. | |
| 6,029,000 A | 2/2000 | Woosley | |
| 6,031,993 A | 2/2000 | Andrews | |
| 6,035,120 A | 3/2000 | Ravichandran | |
| 6,052,527 A * | 4/2000 | Delcourt et al. | 717/138 |
| 6,056,642 A | 5/2000 | Bennett | |
| 6,062,979 A | 5/2000 | Inoue | |
| 6,066,181 A | 5/2000 | DeMaster | |
| 6,071,192 A | 6/2000 | Weiss | |
| 6,074,432 A | 6/2000 | Guccione | |
| 6,075,940 A | 6/2000 | Gosling | |
| 6,079,985 A | 6/2000 | Wohl et al. | |
| 6,084,169 A | 7/2000 | Hasegawa et al. | |
| 6,089,976 A | 7/2000 | Schneider et al. | |
| 6,089,978 A * | 7/2000 | Adams | 463/20 |
| 6,092,147 A | 7/2000 | Levy | |
| 6,096,095 A | 8/2000 | Halstead | |
| 6,102,400 A | 8/2000 | Scott et al. | |
| 6,103,964 A | 8/2000 | Kay | |
| 6,106,393 A | 8/2000 | Sunaga et al. | |
| 6,110,041 A | 8/2000 | Walker et al. | |
| 6,110,043 A | 8/2000 | Olsen | |
| 6,110,226 A | 8/2000 | Bothner | |
| 6,113,495 A | 9/2000 | Walker | |
| 6,117,009 A | 9/2000 | Yoseloff | |
| 6,126,165 A | 10/2000 | Sakamoto | |
| 6,131,191 A | 10/2000 | Cierniak | |
| 6,138,273 A | 10/2000 | Sturges | |
| 6,141,794 A | 10/2000 | Dice | |
| 6,142,875 A | 11/2000 | Kodachi et al. | |
| 6,146,273 A | 11/2000 | Olsen | |
| 6,146,276 A | 11/2000 | Okuniewicz | |
| 6,155,925 A | 12/2000 | Giobbi et al. | |
| 6,159,096 A | 12/2000 | Yoseloff | |
| 6,159,097 A | 12/2000 | Gura | |
| 6,162,122 A | 12/2000 | Acres et al. | |
| 6,174,233 B1 | 1/2001 | Sunaga et al. | |
| 6,174,235 B1 | 1/2001 | Walker et al. | |
| 6,175,632 B1 | 1/2001 | Marx | |
| 6,186,894 B1 | 2/2001 | Mayeroff | |
| 6,198,395 B1 | 3/2001 | Sussman | |
| 6,217,448 B1 | 4/2001 | Olsen | |
| 6,224,482 B1 | 5/2001 | Bennet | |
| 6,233,731 B1 * | 5/2001 | Bond et al. | 717/138 |
| 6,238,288 B1 | 5/2001 | Walker et al. | |
| 6,241,612 B1 | 6/2001 | Heredia | |
| 6,254,481 B1 | 7/2001 | Jaffe | |
| 6,257,981 B1 | 7/2001 | Acres et al. | |
| 6,270,411 B1 | 8/2001 | Gura et al. | |
| 6,287,197 B1 | 9/2001 | Dickinson et al. | |
| 6,290,600 B1 | 9/2001 | Glasson | |
| 6,293,869 B1 | 9/2001 | Kwan et al. | |
| 6,295,638 B1 * | 9/2001 | Brown et al. | 717/148 |
| 6,302,790 B1 | 10/2001 | Brossard | |
| 6,306,034 B1 | 10/2001 | Sakamoto et al. | |

| | | | |
|---|---|---|---|
| 6,309,299 B1 | 10/2001 | Weiss | |
| 6,309,301 B1 | 10/2001 | Sano | |
| 6,311,982 B1 | 11/2001 | Lebensfeld et al. | |
| 6,319,125 B1 | 11/2001 | Acres | |
| 6,321,323 B1 * | 11/2001 | Nugroho et al. | 712/34 |
| 6,328,648 B1 | 12/2001 | Walker et al. | |
| 6,364,768 B1 | 4/2002 | Acres et al. | |
| 6,375,567 B1 | 4/2002 | Acres | |
| 6,375,568 B1 | 4/2002 | Roffman et al. | |
| 6,375,569 B1 | 4/2002 | Acres | |
| 6,390,923 B1 | 5/2002 | Yoshitomi et al. | |
| 6,409,596 B1 | 6/2002 | Hayashida et al. | |
| 6,416,411 B1 | 7/2002 | Tsukahara | |
| RE37,885 E | 10/2002 | Acres et al. | |
| 6,491,584 B2 | 12/2002 | Graham et al. | |
| 6,504,089 B1 | 1/2003 | Negishi et al. | |
| 6,516,466 B1 | 2/2003 | Jackson | |
| 6,533,658 B1 | 3/2003 | Walker et al. | |
| 6,537,152 B2 | 3/2003 | Seelig et al. | |
| 6,544,122 B2 | 4/2003 | Araki et al. | |
| 6,554,703 B1 | 4/2003 | Bussick et al. | |
| 6,561,908 B1 | 5/2003 | Hoke | |
| 6,565,434 B1 | 5/2003 | Acres | |
| 6,565,436 B1 | 5/2003 | Baerlocher | |
| 6,599,195 B1 | 7/2003 | Araki et al. | |
| 6,638,169 B2 | 10/2003 | Wilder et al. | |
| 6,656,046 B1 | 12/2003 | Yoseloff et al. | |
| 6,682,073 B2 | 1/2004 | Bryant et al. | |
| 6,729,618 B1 | 5/2004 | Koenig et al. | |
| 6,739,973 B1 | 5/2004 | Lucchesi et al. | |
| 6,755,738 B2 | 6/2004 | Glasson et al. | |
| 6,769,985 B1 * | 8/2004 | Laakso et al. | 463/25 |
| 6,810,517 B2 * | 10/2004 | Bond et al. | 717/138 |
| 6,835,132 B2 | 12/2004 | Bennett | |
| 6,848,996 B2 | 2/2005 | Hecht et al. | |
| 6,935,955 B1 | 8/2005 | Kaminkow et al. | |
| 6,939,226 B1 | 9/2005 | Joshi | |
| 6,942,574 B1 | 9/2005 | LeMay | |
| 7,355,112 B2 | 4/2008 | Laakso | |
| 2001/0029542 A1 * | 10/2001 | Nishimura | 709/231 |
| 2001/0044339 A1 * | 11/2001 | Cordero et al. | 463/42 |
| 2002/0039919 A1 | 4/2002 | Joshi et al. | |
| 2002/0077165 A1 | 6/2002 | Bansemer et al. | |
| 2002/0090990 A1 | 7/2002 | Joshi et al. | |
| 2002/0109718 A1 * | 8/2002 | Mansour et al. | 345/744 |
| 2003/0064798 A1 | 4/2003 | Grauzer et al. | |
| 2003/0064801 A1 | 4/2003 | Breckner et al. | |
| 2003/0064608 A1 | 4/2003 | Hecht et al. | |
| 2003/0073489 A1 | 4/2003 | Hecht et al. | |
| 2003/0073490 A1 | 4/2003 | Hecht et al. | |
| 2003/0073491 A1 | 4/2003 | Hecht et al. | |
| 2003/0078103 A1 | 4/2003 | LeMay et al. | |
| 2004/0048657 A1 | 3/2004 | Gauselmann | |
| 2004/0053695 A1 | 3/2004 | Mattice et al. | |
| 2004/0063489 A1 | 4/2004 | Crumby | |
| 2004/0142739 A1 | 7/2004 | Loose et al. | |
| 2004/0142747 A1 | 7/2004 | Pryzby | |
| 2004/0209685 A1 | 10/2004 | Lucchesi et al. | |
| 2005/0043090 A1 | 2/2005 | Pryzby et al. | |
| 2005/0054440 A1 | 3/2005 | Anderson et al. | |
| 2005/0054442 A1 | 3/2005 | Anderson et al. | |
| 2005/0064935 A1 | 3/2005 | Blanco | |
| 2005/0159218 A1 | 7/2005 | Blanco | |
| 2005/0193369 A1 * | 9/2005 | Brumme et al. | 717/106 |
| 2005/0277469 A1 | 12/2005 | Pryzby et al. | |
| 2005/0282631 A1 | 12/2005 | Bonney et al. | |
| 2006/0073881 A1 | 4/2006 | Pryzby et al. | |

FOREIGN PATENT DOCUMENTS

| | | |
|---|---|---|
| EP | 0 945 837 A2 | 9/1999 |
| EP | 0 978 809 A2 | 2/2000 |
| EP | 0 993 847 | 4/2000 |
| EP | 0 997 856 A2 | 5/2000 |
| EP | 0 997 857 A2 | 5/2000 |
| EP | 1 000 642 | 5/2000 |
| EP | 1 079 345 A1 | 2/2001 |
| EP | 0 997 856 A2 | 5/2002 |
| EP | 1 225 565 A2 | 7/2002 |
| EP | 1439507 A3 | 3/2005 |
| GB | 2 201 279 A | 8/1988 |
| JP | 11197292 A | 12/1997 |
| JP | 411216221 A | 8/1999 |
| JP | 2000107466 A | 4/2000 |
| JP | 02000296209 A | 10/2000 |
| JP | 2001062029 A | 3/2001 |
| JP | 2003290422 | 10/2003 |
| WO | WO 97/32285 | 9/1997 |
| WO | WO 02/17295 | 2/2002 |
| WO | WO 2004/014501 A2 | 2/2004 |
| WO | WO 2007/044175 | 4/2004 |
| WO | 2005113089 A1 | 12/2005 |
| WO | 2005113091 A1 | 12/2005 |
| WO | 2005114598 A1 | 12/2005 |
| WO | 2005117647 A1 | 12/2005 |
| WO | 2005120127 A1 | 12/2005 |
| WO | WO2006017036 A1 | 2/2006 |
| WO | WO2006017445 A2 | 2/2006 |

OTHER PUBLICATIONS

Article, "Frankie & Annette's Beach Party Bally Gaming," published by Strictly Slots, Dec. 2001.

Article, "Megaman X's Soundcard History Museum," pp. 1-5, retrieved on May 11, 2000 on Internet at http://digitalparadise.cgocable.ca/MegaMan_X/Soundcards.

Article, "Microprocessor Report," pp. 2, 12-17, published by Micro Design Resources on Mar. 25, 1996.

Article, "Monopoly Movers & Shakers Williams/WMS Gaming," published by Strictly Slots publication in Jul. 2000.

Brochure of Bally Gaming, Inc., "EVO HYBRID Frankie & Annette's Beach Party," published by Bally Gaming, Inc. in the year 2001 on or before December thereof.

Brochure of IGT, "Leopard Spots, Double Diamond 2000, Little Green Men, Elephant King, I Dream of Jeannie," available in Oct. 1999.

Brochure of IGT, "Run for Your Money S-Plus Limited," published in the year 1998 on or before December thereof.

Brochure of IGT, "Top Dollar S-Plus Limited," published in the year 1998 on or before December thereof.

Brochure of IGT, "Totem Pole," written by IGT, available in the year 1997, on or before December thereof.

Brochure of IGT, "Wheel of Fortune," published in the year 1998 on or before December thereof.

Brochure of WMS Gaming Inc., "Meet the Next Generation of Monopoly Slot Machines from WMS Gaming!" published by Hasbro, Inc. in the year 1999 on or before December thereof.

Brochure of WMS Gaming Inc., "Monopoly Chairman of the Board," published by Hasbro, Inc. in the year 1999 on or before December thereof.

Brochure of WMS Gaming Inc., "Monopoly Once Around," published by Hasbro, Inc. in the year 1998 on or before December thereof.

Brochure of WMS Gaming Inc., "Monopoly Reel Estate," published by Hasbro, Inc. in the year 1998 on or before December thereof.

Brochure of WMS Gaming Inc., "Movers & Shakers," published by Hasbro, Inc. in the year 2000 on or before December thereof.

Chutes and Ladders CD-ROM Game, Hasbro Interactive, Inc., available in the year 1999 on or before December thereof.

Description of Accelerated Credit Roll-Up in Gaming Machines written by IGT, available in the year 1999 on or before December thereof.

Description of Action Prompts in Gaming Machines, written by IGT, available in the year 1999 on or before December thereof.

Description of Last Sound in Credit Roll-Up in Gaming Machines written by IGT, available in the year 2000 on or before December thereof.

Description of Lighting Features in Gaming Machines, written by IGT, available in the year 1999 on or before December thereof.

Description of Maximum Wager Sound and Bet Sounds in Gaming Devices written by IGT, available in the year 2000 on or before December thereof.

Description of Payout Sound Feature in Gaming Machine written by IGT, available in the year 1999 on or before December thereof.

Description of Progressive Sound Feature in Pinball and Video

Games written by IGT, available in the year 1999 on or before December thereof.

Description of Sound Effects in Gaming Devices written by IGT, available in the year 2000 on or before December thereof.

Description of Sound Feature in Totem Polem™ Gaming Machine written by IGT, available in the year 1997 on or before December thereof.

Description of Tempo Change In Gaming Machines written by IGT, available in the year 2000 on or before December thereof.

Description of Verbal Wager Feature in "Dick Clark" Gaming Machine written by IGT, available in the year 2000 on or before December thereof.

Description of Volume Control Functions in Gaming Machines written by IGT, available in the year 1999 on or before December thereof.

MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.

Press Release, "WMS Gaming's Monopoly Slot Machines Named 1998's Most Innovative Gaming Product At The American Gaming, Lodging and Leisure Summit," published by WMS Gaming Inc. on Jan. 13, 1999.

Screen Shot and Description by IGT of "Free Spins Bonus (Elephant King)" written by IGT, available in Oct. 1999.

Screen Shots of "Race Car Bonus Feature" written by IGT, available in the year 1998 on or before December thereof.

Banana-Rama Brochure, published by Silicon Gaming, available prior to Dec. 2000.

Bally Gaming, Inc. Frankie & Annette's Beach Party (EVO Hydbrid) [online], [retrieved on Jan. 9, 2004]. Retrieved from the internet <URL: http://baiigaming.com/ gamerooms.asp?gameID=664>.

Break the Spell Brochure, published by Atronics in 1999, on or before December therof.

Cash Chameleon Brochure, written by Aristocrat, published in Oct. 2000.

Cliff Hangers [online], [retrieved on Mar. 21, 2001]. Retrieved from the Internet, <URL:http://www.geocities.com/Hollywood/Set/9859/tpir/tpir10.html>.

Cliff Hangers [online], [retrieved on Mar. 21, 2001]. Retrieved from the Internet, <URL:http://members.aol.com/schmoliktpir/hangers.html>.

Cliff Hangers Bonus and Plinko Bonus Advertisement, published prior to Sep. 9, 2003.

Definition of Pitch, Merriam—Webster's Collegiate Dictionary, Tenth Edition, p. 886, 1999, on or before December thereof.

Description of Animating Symbol Feature in Gaming Machines, available prior to Dec. 2000.

Fried, Ian, CNET News.com. Microsoft Releases XP for Slot Machines [online], [retrieved on Nov. 28, 2001]. Retrieved from the Internet <URL: http://news.com.com/XP+for+slot+machines%2C+ATMs+released/2100-1040_3-276302.html>.

IGT. Elephant King [online], [retrieved on Mar. 21, 2001]. Retrieved from the Internet, URL:http://www.igt.com/games/new_games/elephant.html>.

Jazzy Jackpots Advertisements written by Atronic, published in 2000, on or before December thereof.

Jazzy Jackpots Article written by Strictly Slots, published in Mar. 2001.

Slots 2003, written by Melissa Raimondi, published in Jan. 2003.

The Java™ Tutorial. "What Can Java Technology Do?" [online]. pp. 1-2 [retrieved on Oct. 16, 2000]. Retrieved from the Internet <URL: http://java.sun.com/docs/books /tutorial/getStarted/i...definition.htm>.

The MIDI File Format. [online]. pp. 1-10 [retrieved on Dec. 28, 2001]. Retrieved from the Internet <URL: http://erystal.capana.org.au/ghansper/midi_introduction/midi_file_format.html>.

The Price is Right Featuring Plinko Advertisement written by IGT, published in 2001, on or before December thereof.

The Price is Right Plinko written by IGT, published in Dec. 2001.

Cash Competition Video Game Tournament Sites Roundup (Xbox, PlayStation, PC Games), printed from http://www.betfromanywhere.com on Jun. 15, 2009.

* cited by examiner

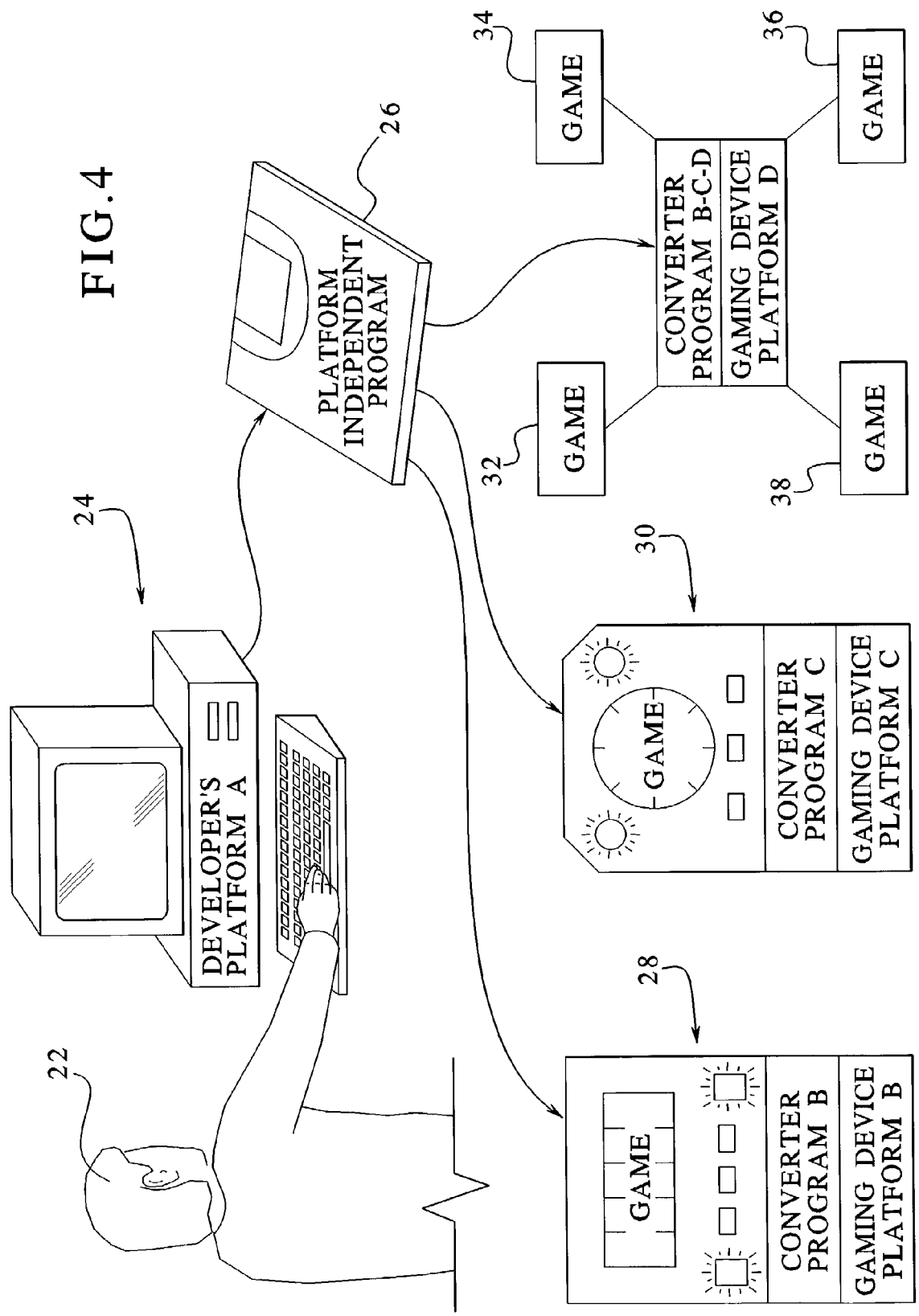

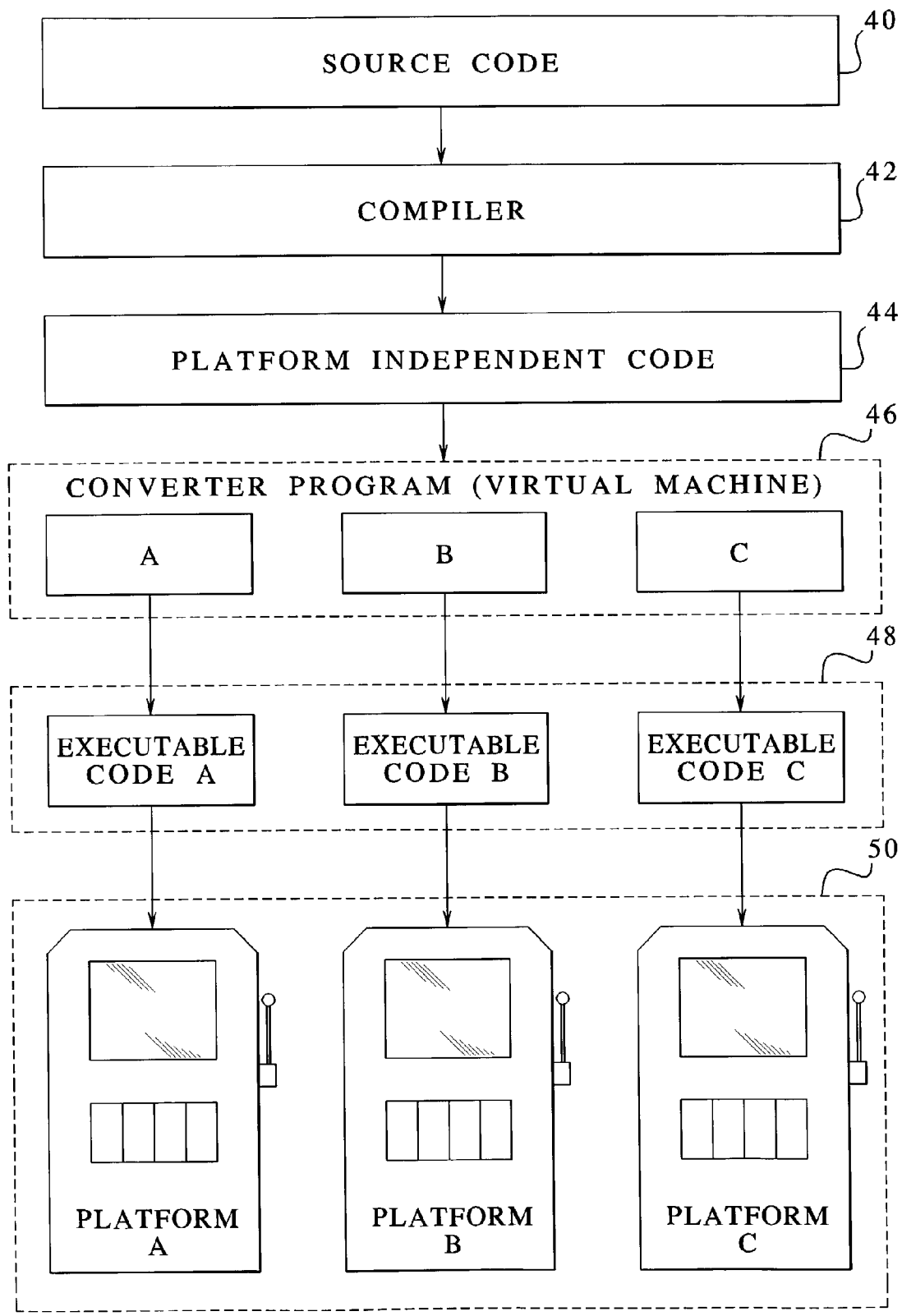

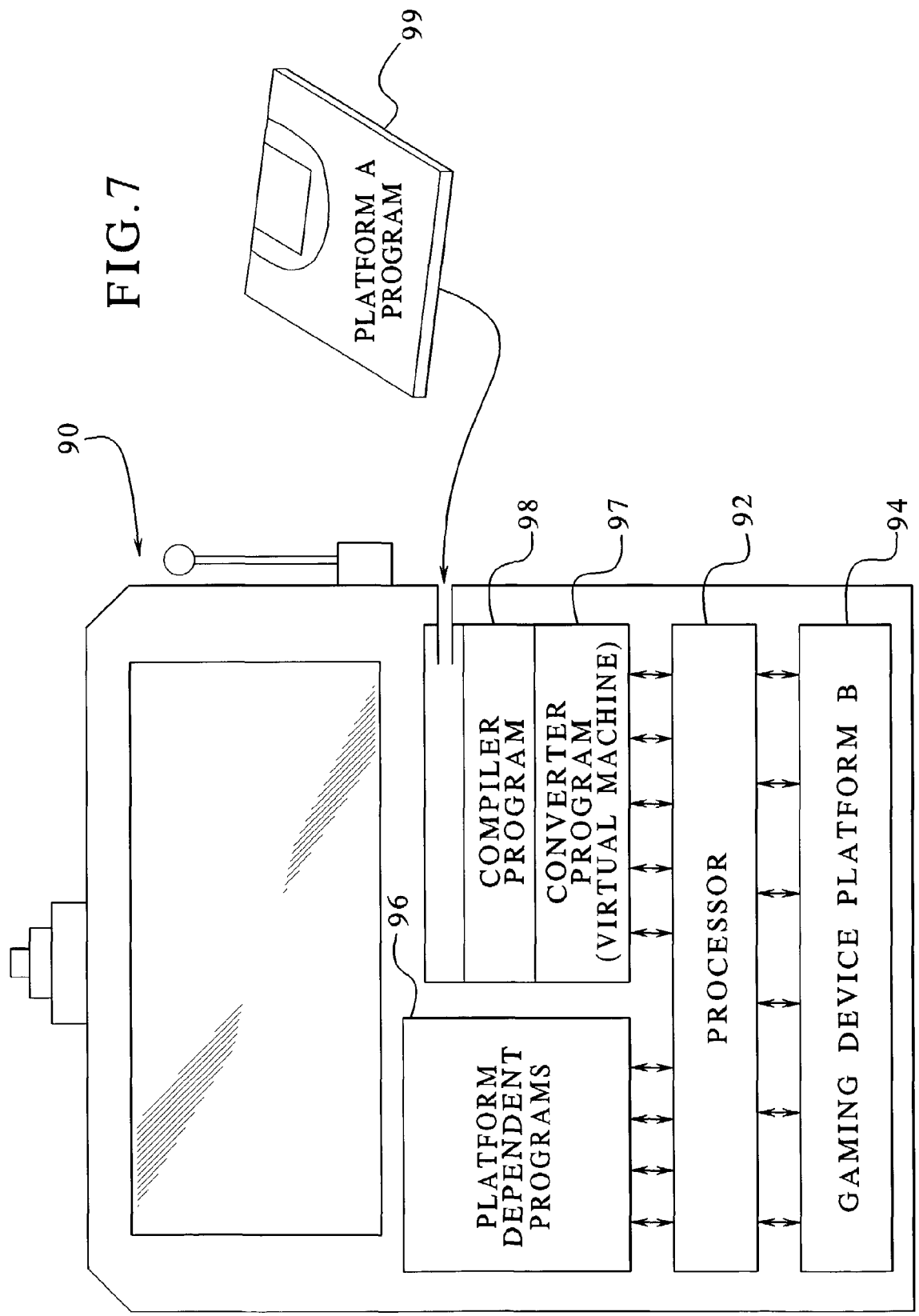

GAMING DEVICE OPERABLE WITH PLATFORM INDEPENDENT CODE AND METHOD

PRIORITY CLAIM

This application claims the benefit of U.S. Provisional Patent Application entitled "Gaming Device Operable With Platform Independent Code and Method," Ser. No. 60/325,974, filed Sep. 28, 2001.

COPYRIGHT NOTICE

The platform or operating system sold under the trademark MICROSOFT WINDOWS™, is a family of operating systems for personal computers. This family of operating systems, adopted by much of the personal computer world, provides a graphical user interface (GUI), virtual memory management, multitasking, and support for many peripheral devices.

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which is adapted to operate using platform independent code.

BACKGROUND OF THE INVENTION

Known gaming devices, such as slot machines, poker machines, blackjack machines or keno machines, include a central processing unit ("CPU"), microprocessor or other processor which operates on a particular or designated platform or operating system. These gaming devices only run programs which are in a format which is specifically compatible with or programmed for their platforms.

For example, if a gaming device has a type X platform, the gaming device can only operate with X-based programs, or if a gaming device has a type Y platform, the gaming device can only operate with Y-based programs. One disadvantage to these gaming devices is they require game developers to write code in the particular format which is compatible with the gaming device's platform. For example, a developer's computer system must have a platform which is identical in type to the gaming device's platform.

Currently, as illustrated in FIG. 1, if a developer uses a type A platform 2a to write code 4a, only a gaming device 6a with a type A platform can read and use this code 4a. The same applies to a type B platform 6b, type C platform 6c or any other type of platform, as illustrated in FIG. 1. In operation, as illustrated in FIG. 2, a developer writes source code on a computer system having a particular platform. The computer system then compiles the source code into object code which is in a format compatible with the computer system's platform. This object code is loaded into and executed, run or used by a gaming device which operates on a platform which is identical in type to the platform of the developer's computer system. The type of gaming device platform thus limits the type of development platform a developer can use to develop gaming device programs.

This limitation is problematic because many gaming devices have industrial or proprietary platforms. These platforms are not wide spread platforms, such as the platform sold under the trademark, WINDOWS™, MACINTOSH™ or SOLARIS™, each of which is described below. Accordingly, game developers often do not have the ability to use off-the-shelf, more advanced and user friendly development programs which operate on wide spread platforms.

SUMMARY OF THE INVENTION

The present invention overcomes the above shortcomings by providing a gaming device which operates based upon programs which, when loaded into the gaming device, have formats which are incompatible with the gaming device's platform.

The gaming device includes at least one processor operating on a particular platform type and at least one converter program stored in a memory device. The gaming device's platform is compatible with a particular program format. The term "program format," as referred to herein, includes a format for a computer program which is compatible with or required by a particular type of platform. For example, the program format commercially available under the WINDOWS™ trademark, is the type of program format for the platform sold under the WINDOWS™ trademark, which is described below. Programs which have the format required by the gaming device's platform are at times referred to herein as native programs having native formats. Programs which have a format which is incompatible with the gaming device's platform are at times referred to herein as foreign programs having foreign formats.

The gaming device processor uses the converter program to convert foreign programs into the format associated with the gaming device's platform. The gaming device processor then causes the gaming device to perform a function or produce an output based on such foreign programs.

For example, if a foreign program includes sound code, the output is preferably game sound. If the foreign program includes graphics code, the output is preferably some graphics. In another example, if the foreign program includes paytable code, the gaming device processor can implement a particular paytable code in the wagering game.

In one embodiment, the gaming device includes a processor operating on a predetermined computer operating system or platform. The gaming device includes a memory device which stores native programs or platform dependent programs and at least one converter program. The platform dependent programs include computer programs or code which is written in a format which is compatible with and specific to the gaming device platform and readable by the gaming device processor. For example, if a gaming device had a type A platform, the platform dependent programs would be type A programs.

The converter program, at times referred to herein as a virtual machine, includes any suitable computer program or code which can adapt, change or convert a platform independent program into a format which is compatible with a gaming device's platform. The converter program includes instructions which change or modify the code of a platform independent program in order to meet the format requirements of a predetermined processor which is operating on a predetermined platform. Accordingly, certain portions of the converter program are dependent upon or specific to the type of platform upon which the converter program is loaded. Other portions of the converter program are generic or, in other words, not specific to the type of platform upon which the converter program is loaded.

In operation of one embodiment of the present invention, a developer writes source code for a gaming device program on any desired platform. The developer then compiles the source code, preferably using the developer's own computer system. Specifically, the developer compiles the source code in such a manner so that the source code changes into platform independent code in a machine readable format. Such compilation can be accomplished through commercially available compilers or any other suitable compiler. The converter program, loaded onto a gaming device, interprets, translates, compiles or otherwise changes the platform-independent code into a format which is executable by the gaming device's processor which operates on the particular platform of the gaming device. The gaming device processor can then read such executable code and operate a game using such executable code.

In one embodiment, the actual code or platform dependent code includes game code, and the platform-independent code includes sound code. The game code includes play instructions which direct the gaming device processor to operate a game according to predetermined rules. The game code also includes sound event input instructions or instruction calls. Sound event input instructions or calls direct the gaming device processor to cause a sound change upon the occurrence of a predetermined event, such as the winning of a bonus value.

The instruction calls direct the gaming device processor to read the sound code, which, in turn, instructs the gaming device processor as to the specific type of sound change to generate when a predetermined event occurs, such as the player winning a bonus value. In this embodiment, the game code is isolated from the sound code. This type of code isolation facilitates focused development of different categories of code (such as sound code or graphics code) which ties into the game code.

The gaming device of the present invention is not restricted to using programs which are written on platforms which are identical to the gaming device platform. Rather, the gaming device includes a suitable virtual machine or dependent-making code which enables the gaming device to use suitable platform independent programs which were written on any type of platform. This type of gaming device facilitates the development and production of more advanced and entertaining programs for gaming device players.

It is therefore an advantage of the present invention to provide a gaming device which is operable with platform independent code and a method of developing code for such a gaming device.

Another advantage is to provide a gaming device which can operate based upon programs which are formatted for a platform which is different from the gaming device's platform.

Yet another advantage is to facilitate the development of gaming device programs.

Another advantage is to provide a gaming device which includes isolated portions of the overall gaming device code to facilitate the development of gaming device programs.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4 is a schematic diagram of various gaming devices in various embodiments of the present invention, illustrating the operation of the gaming devices based upon a single platform independent program written on a platform which is different from the gaming device platforms.

FIG. 5 is a schematic flow diagram illustrating, in one embodiment of the present invention, the writing of source code, the changing of the source code into platform independent code and the use of the platform-independent code to operate gaming devices having various platforms.

FIG. 7 is a schematic block diagram of the gaming device of one embodiment of the present invention.

DETAILED DESCRIPTION OF THE INVENTION

Gaming Device Electronics

Figure 1:
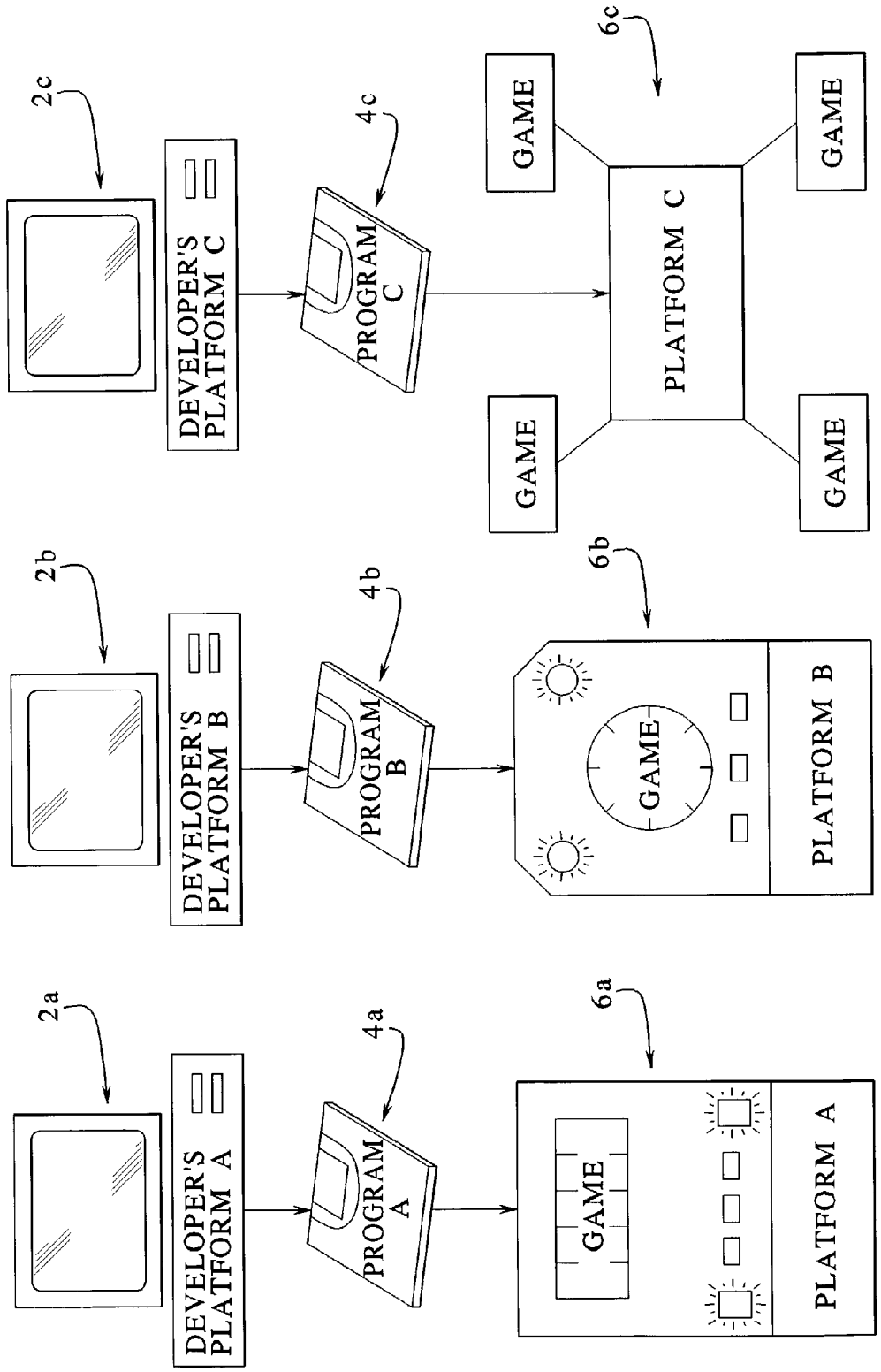
FIG. 1 is a schematic diagram illustrating known gaming devices which require different formats of programs for different types of gaming device platforms.
Figure 2:
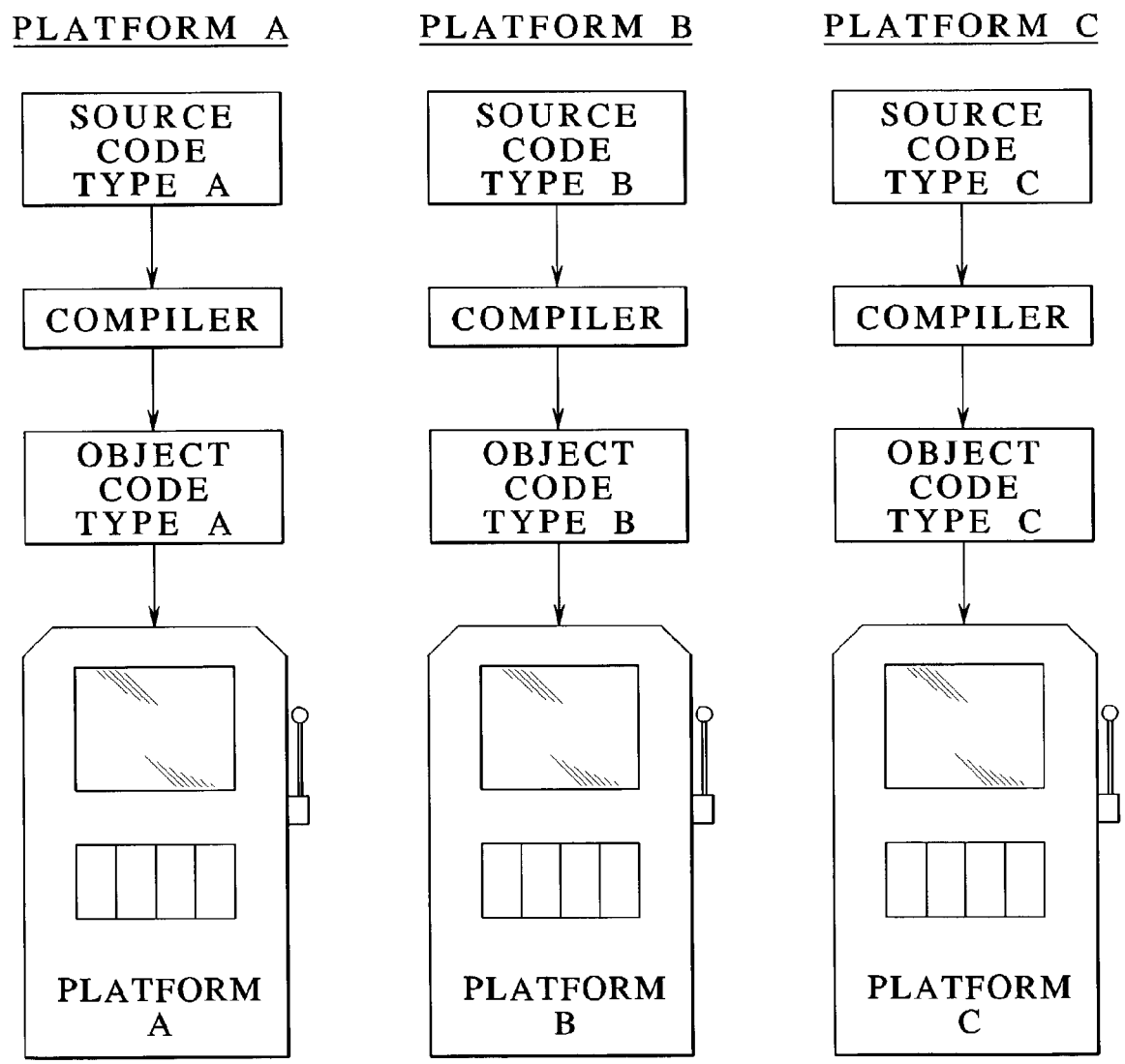
FIG. 2 is a flow diagram illustrating the known methods of writing code on a platform which is identical in type to the gaming device's platform and using that code to operate a gaming device.
Figure 3:
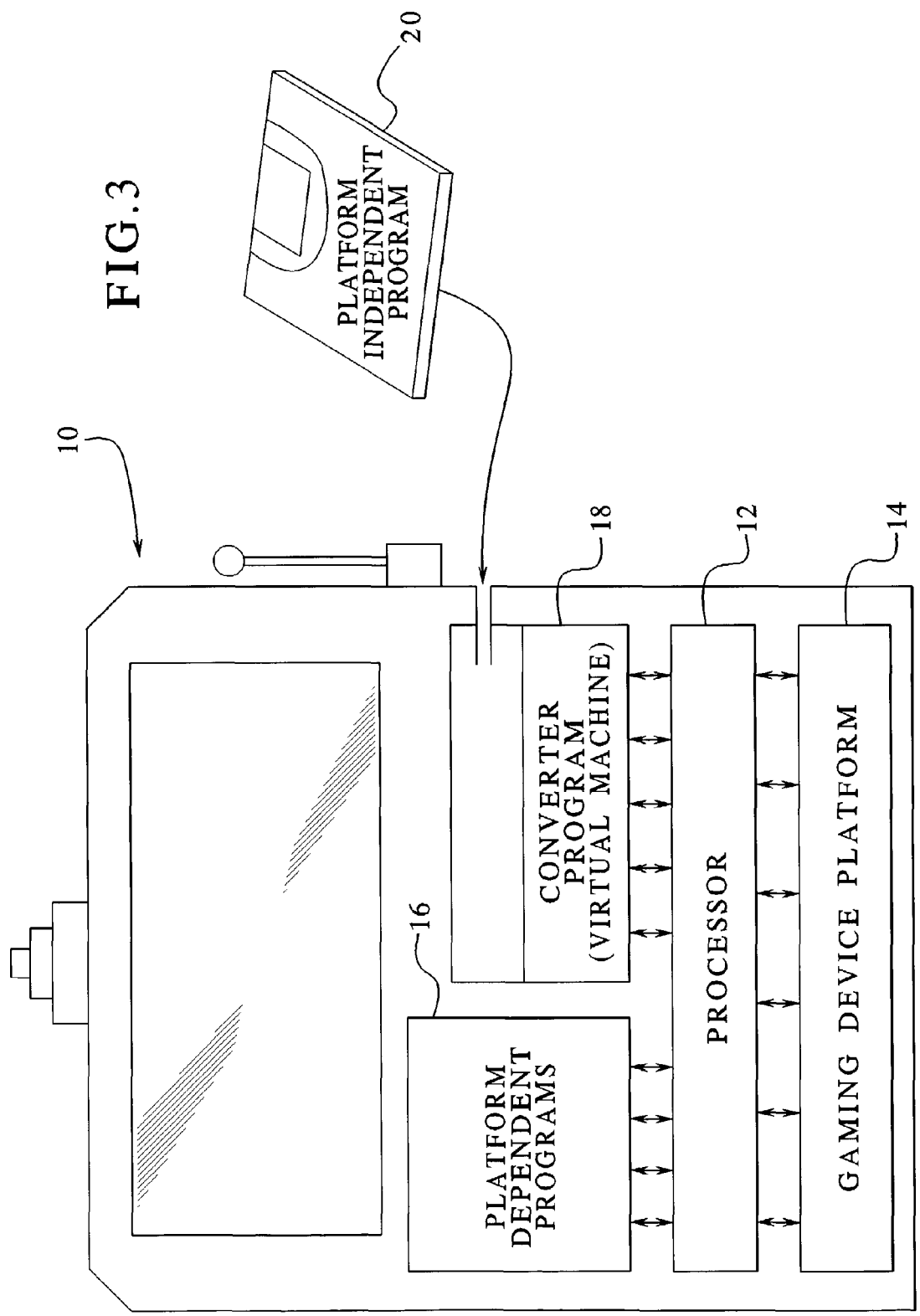
FIG. 3 is a schematic block diagram of the gaming device of one embodiment of the present invention.

Turning now to FIG. 3, in one embodiment gaming device 10 of the present invention includes a processor 12 operating on a predetermined computer operating system or platform 14. The gaming device 10 includes a memory device (not shown) which stores platform dependent programs 16 and a virtual machine or converter program 18. The platform dependent programs 16 include computer programs or code which is written in a format which is compatible with and specific to platform 14 and readable by processor 12. For example, if a gaming device had a type A platform, the platform dependent programs would be type A programs.

The virtual machine or converter program 18, includes any computer program or code which can adapt or convert a platform independent program 20 into a format which is compatible with platform 14 and readable by processor 12. Generally, without the converter program 18, the processor 12 could not read the platform independent program 20.

The converter program 18 includes instructions which change or modify the code of a platform independent program 20 in order to meet the format requirements of a predetermined processor 12 which is operating on a predetermined platform 14. Accordingly, certain portions of the converter program 18 are dependent upon or specific to the type of platform 14 upon which the converter program 18 is loaded. Other portions of the converter program 18 are generic or, in other words, not specific to the type of platform 14 upon which the converter program 18 is loaded.

For example, a fictitious dependent command may be "PLAY SOUND BLASTER THIRTY-TWO (MY SOUND)." This command is dependent upon and specific to sound blaster thirty-two processing hardware. The conventional computer or gaming device which lacks this type of hardware cannot execute this command. The converter program would convert this command into a generic command, such as "PLAY (MY SOUND)." Any computer or gaming device (with or without the sound blaster hardware) could execute this command. In order to do so, the converter program includes relational data or instructions which relate sound blaster thirty-two information to generic play information.

The converter program 18 can be an interpreter, compiler, translator or any other suitable type of program. The converter program 18 preferably includes information or data categorized in tables or libraries. The data is specific to a predetermined type of platform 14. In operation, the processor 12 uses the instructions and data of the converter program 18 to read the platform independent program 20.

In one embodiment, the converter program 18 can be read and used by a plurality of different types of processors operating on different types of platforms. Here, the converter program 18 includes different categories of instructions, and preferably data. Each category is associated with a different type of computer platform. When this converter program 18 is loaded onto a platform, the converter program instructs the processor to read the instructions in the converter program which are categorized and designated for that particular type of platform. This type of converter program or virtual machine can be used by a plurality of different types of gaming device computer systems.

Platform independent programs and converter programs are commercially available, such as the programming language which is commercially available under the JAVA™ trademark of Sun Microsystems, Inc. In one embodiment, the converter program 18 is a virtual machine ("VM") or interpreter sold under the trademark, "JAVA™." Such VM or interpreter is a high-level, object-oriented programming language which is simplified to exclude language features that cause common programming errors. The source code files of this VM or interpreter are compiled into a format with a .class extension, which can then be executed by an interpreter. Code compiled from this VM or interpreter can run on most computers because the interpreter and runtime environments, commercially available under the JAVA VIRTUAL MACHINES (VMs)™ trademark, exist for most operating systems. With this VM or interpreter, a programmer writes source code in the language commercially available under the JAVA™ trademark, and a processor compiles this source code and generates an intermediate platform-independent code known as bytecodes. The bytecodes are arranged and organized by classes, constants, data structures, fields and other categories. As described above, various types of interpretation code or virtual machines are commercially available under the JAVA™ trademark for different types of computer system platforms. Any computer system which includes a virtual machine commercially available under the JAVA™ trademark, can interpret the bytecodes for execution.

The platform independent program can include any code which is suitable for being converted or otherwise changed into a plurality of formats associated with a plurality of different types of platforms. Preferably, the platform-independent program loaded into a gaming device is in a machine readable and executable form. However, it should be appreciated that the platform independent program, when loaded into a gaming device, can include any suitable programming language, human language (such as English), machine-readable language or any combination thereof. In the case where the platform-independent program is in the form of human language, the source code constitutes the platform-independent program. In this case, the gaming device processor is adapted to directly execute the human language without the human language being compiled.

It should also be appreciated that the source code for the platform independent program can be tokenized instead of being compiled. To tokenize the source code, a developer can use a tokenization program to convert the human language of the source code into predetermined key numbers. For example, the word "play" may be converted into the number 35. The gaming device processor can then be adapted to directly execute the tokenized language.

In one embodiment, the present invention includes a system and method for developing games and game code for gaming devices. As illustrated in FIG. 4, various gaming devices which are loaded with converter programs can operate based on platform independent programs. A developer 22 is able to write platform independent source code (such as the game's sound code) on a computer system 24 which has a type A platform. Type A platform could be any suitable platform, such as a platform sold under the trademark, WINDOWS™, MACINTOSH™ or SOLARIS™, each of which is described below. In one embodiment, the computer system 24 compiles the platform independent source code into platform independent object code, which constitutes the platform independent program 26 stored on disk or other suitable storage medium.

As illustrated in FIG. 4, gaming device 28 has a type B platform and is loaded with converter program B which is compatible with the gaming device's type B platform. Gaming device 30 has a type C platform and is loaded with converter program C which is compatible with the gaming device's type C platform. Gaming devices 32, 34, 36 and 38 retrieve converter program B-C-D from a server (not shown) over a network (not shown). Converter program B-C-D is compatible with the type B platform, type C platform and the type D platform. Gaming devices 28, 30, 32, 34, 36 and 38 can all use the platform independent program 26 to operate. This is the case even though the developer 22 created the platform independent program 26 on a type A platform and even though none of these gaming devices have a type A platform.

In operation of one embodiment of the present invention, as illustrated in FIG. 5, a developer writes source code on any desired platform, as indicated by block 40. The developer then compiles the source code, preferably using the developer's computer system, as indicated by block 42. The compilation results in platform-independent code in a machine readable format, as indicated by block 44. As indicated by blocks 46 and 48, the converter program, loaded onto a gaming device, interprets, translates, compiles or otherwise changes the platform-independent code into a format which is executable by the gaming device's processor which operates on a particular platform. The gaming device processor can then read such executable code and operate a game using such executable code, as indicated by block 50.

Figure 6A:
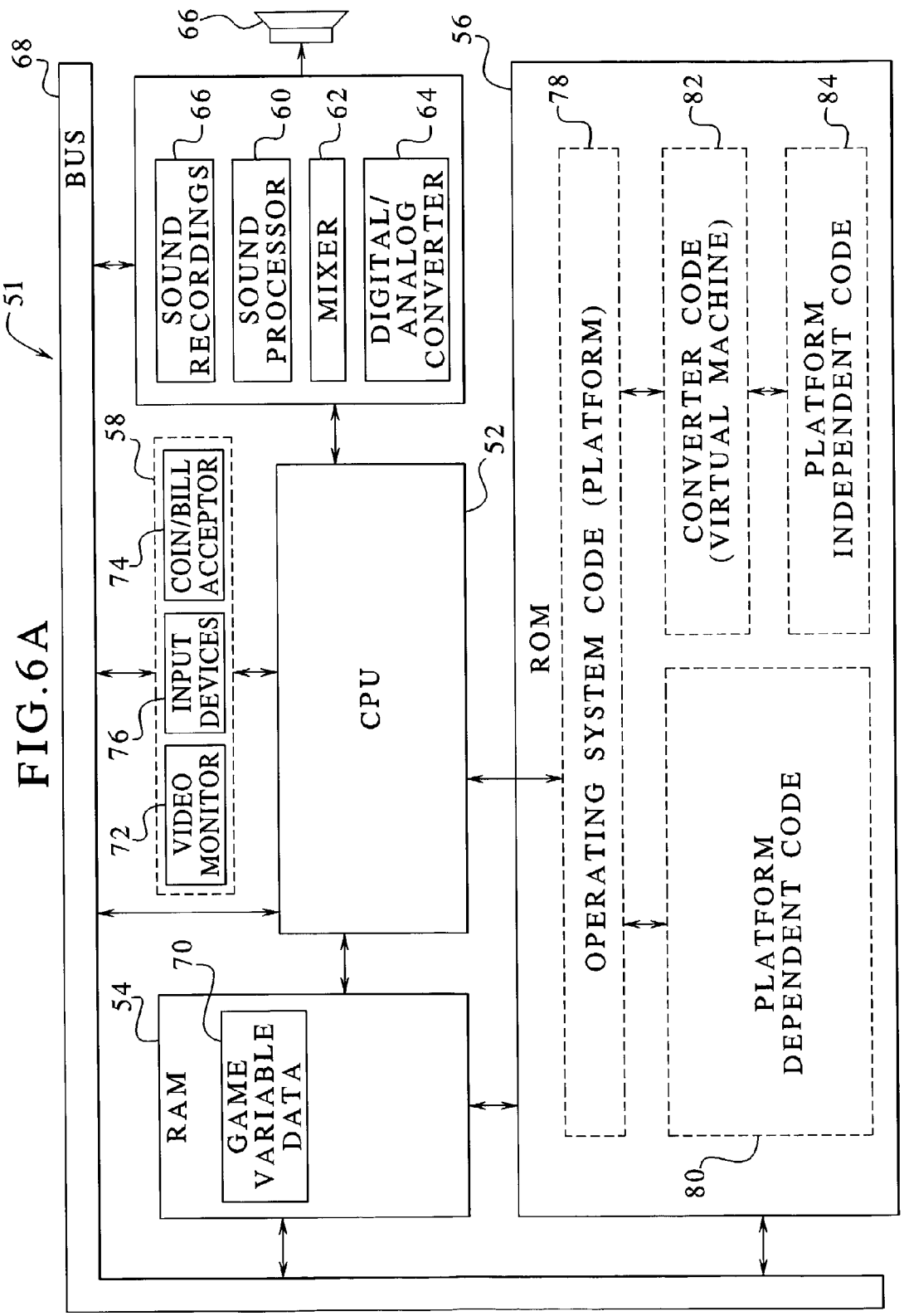
FIG. 6A is a schematic block diagram of the electronic configuration of the gaming device in one embodiment of the present invention.
Figure 6B:
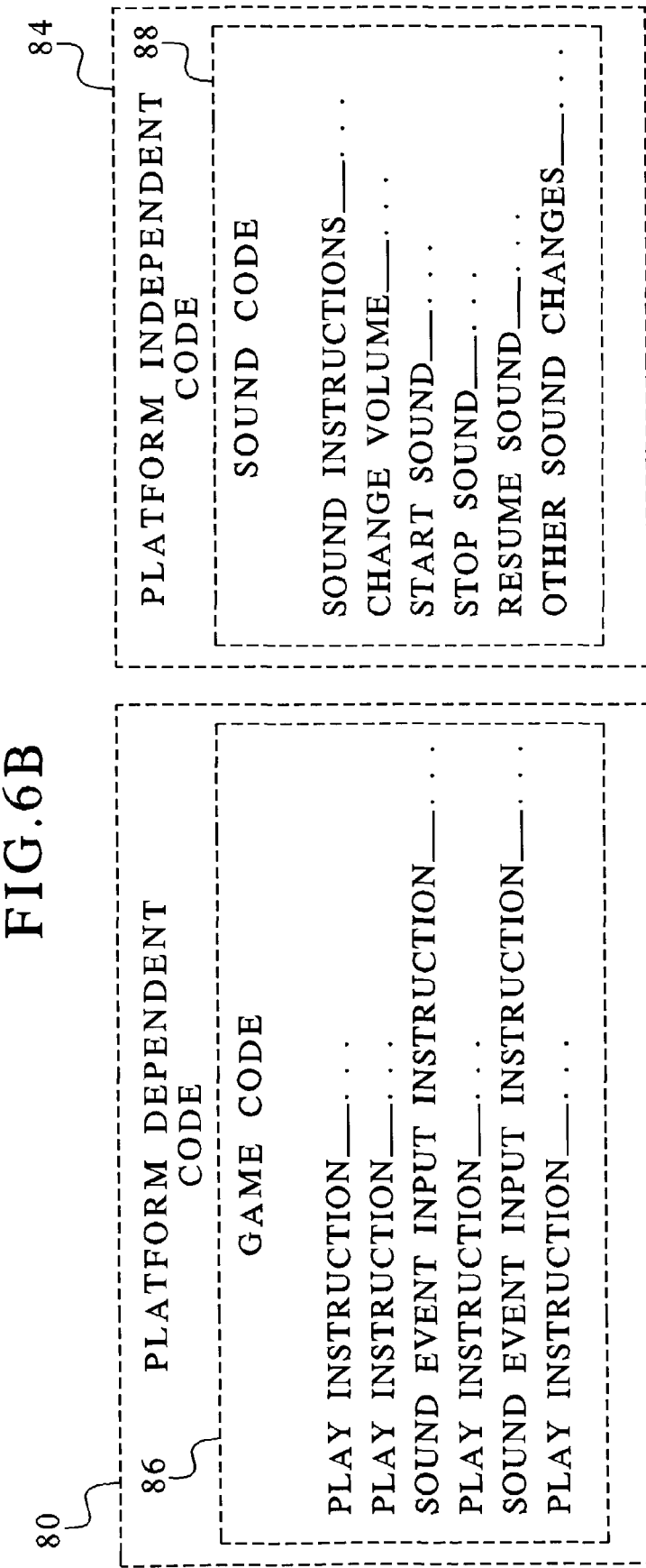
FIG. 6B is a schematic block diagram of the platform-dependent code and platform-independent code in one embodiment of the present invention.

In one embodiment illustrated in FIGS. 6A and 6B, the electronic configuration 51 of the gaming device of the present invention includes a central processing unit (CPU) 52 which communicates with a random access memory (RAM) device 54, a read only memory (ROM) device 56 and a plurality of input and output devices 58. The CPU 52 also communicates with a sound processor 60 which itself communicates with a mixer 62 and a digital/analog converter 64 which plays sound recordings 66. Sound processor 60 outputs sound to speakers 66. All of these electronic components are electrically connected to one another through a bus 68 which enables the components to transmit signals to and from one another.

The RAM 54 includes game variable data 70 which the CPU 52 generates during the operation of the game. Game variable data 70, for example, may include the varying number of inputs made by a player, the varying number of credits won or lost by a player or other data used to keep track of game events. The input and output devices 58 preferably include a video monitor 72 for displaying games to a player, a coin/bill acceptor 74 for receiving currency from a player and other input devices 76 for other purposes.

ROM 56 includes the operating system code or platform 78 of the gaming device. The platform 78 is specific to the particular hardware construction of the CPU 52 because CPU's are constructed to operate on specific types of operating systems or platforms. ROM 56 also includes platform dependent code 80 and virtual machine or dependent-making code 82. Once platform independent code 84 is loaded into the gaming device, the gaming device will include the platform-independent code 84.

As illustrated in FIG. 6B, in one embodiment platform dependent code 80 includes game code 86, and platform-independent code 84 includes sound code 88. Game code 86 includes play instructions which direct the CPU 52 to operate a game according to predetermined rules. Game code 86 also includes sound event input instructions or instruction calls. Sound event input instructions or calls direct the CPU 52 to cause a sound change upon the occurrence of a predetermined event, such as the winning of a bonus value. In operation, as illustrated in FIG. 6B, CPU 52 initiates a game and operates the game in accordance with the first time play instructions. Then CPU 52 reads the sound event input instruction and automatically reads the sound code. CPU 52 then causes the sound processor to generate a sound as specified by the sound code. This process repeats itself from play instruction to sound event input instruction, until the game terminates.

The instruction calls direct the CPU 52 to read the sound code 88, which, in turn, instructs the CPU 52 as to the specific type of sound change to generate when a predetermined event occurs, such as the player winning a bonus value. For example, a predetermined game may require various types of sound changes when a player wins various types of bonus values, such as an increase in volume, starting a predetermined sound recording, stopping a predetermined sound recording, resuming a predetermined sound recording or making any other sound changes or adjustments.

In this embodiment, the game code 86 is isolated from the sound code 88. This type of code isolation facilitates focused development of different categories of code (such as isolated sound code or graphics code) which ties into the game code. For example, a developer can change an entire sound scheme of a game or test a new sound scheme without having to change the game code. Though preferably the isolated code is platform-independent, it should be appreciated that the isolated code can be platform dependent code.

In the embodiment where the sound code is platform-independent, a developer can fully develop and test various sound code schemes on a wide-spread, commercially available platform, such as the platform sold under the trademark WINDOWS™, which is described below. The developer can then load the platform-independent sound code into a gaming device of the present invention. The gaming device will then operate a game in accordance with the new sound scheme.

In one embodiment, the platform independent code installed in the gaming device is graphics code. The graphics code instructs the processor to display predetermined graphics on the display device during games. The converter code enables the processor to read and use the graphics code for the operation of games. In other embodiments, the platform independent code can be paytable code or any other code related to any aspect of a game. Preferably, the platform-independent graphics code, paytable code and other code are isolated from the game code similar to the sound code.

In an alternative embodiment, a game developer can write a program on a non-gaming device platform, such as a platform sold under the trademark WINDOWS™ (described below), and load the executable version of that program onto the gaming device. In this embodiment, the developer need not change the program into a platform-independent format. The gaming device includes one or more compiler or other suitable programs which change programs from dependent format into platform independent format. The gaming device's converter program converts or changes the platform independent program into a program which is readable by the gaming device processor. Because the gaming device includes the programs necessary to both change the developer's program into independent format and convert that program into a format readable by the gaming device processor, any conventional (platform dependent) program can be used to run a game on the gaming device.

As illustrated in FIG. 7, in one example of this embodiment, gaming device 90 includes a processor 92 operating on a type B gaming device platform 94. Processor 92 uses platform dependent programs 96, converter program 97 and compiler program 98. This gaming device can receive a program 99 which is dependent upon a desktop type A platform, for example. The gaming device uses the compiler program 98 to change the program 99 into a platform-independent format. The gaming device then uses converter program 97 to convert or change the compiled program (which is in a platform independent format) into a format which is dependent upon and specific to the gaming device type B platform. In doing so, the gaming device can be operated by loading a program into the gaming device which is completely dependent upon a platform other than the gaming device platform.

The gaming device of the present invention includes the electronic configuration which enables the gaming device to operate based upon code (platform-independent code) which is incompatible with the platform of the gaming device. The gaming device can read and use this platform-independent code because the gaming device includes a platform converter program or virtual machine which is compatible with the gaming device platform. The gaming device processor can thus read and use the converter program in order to read and use platform-independent programs for operating the gaming device.

Gaming Device Structure

Figure 8A:
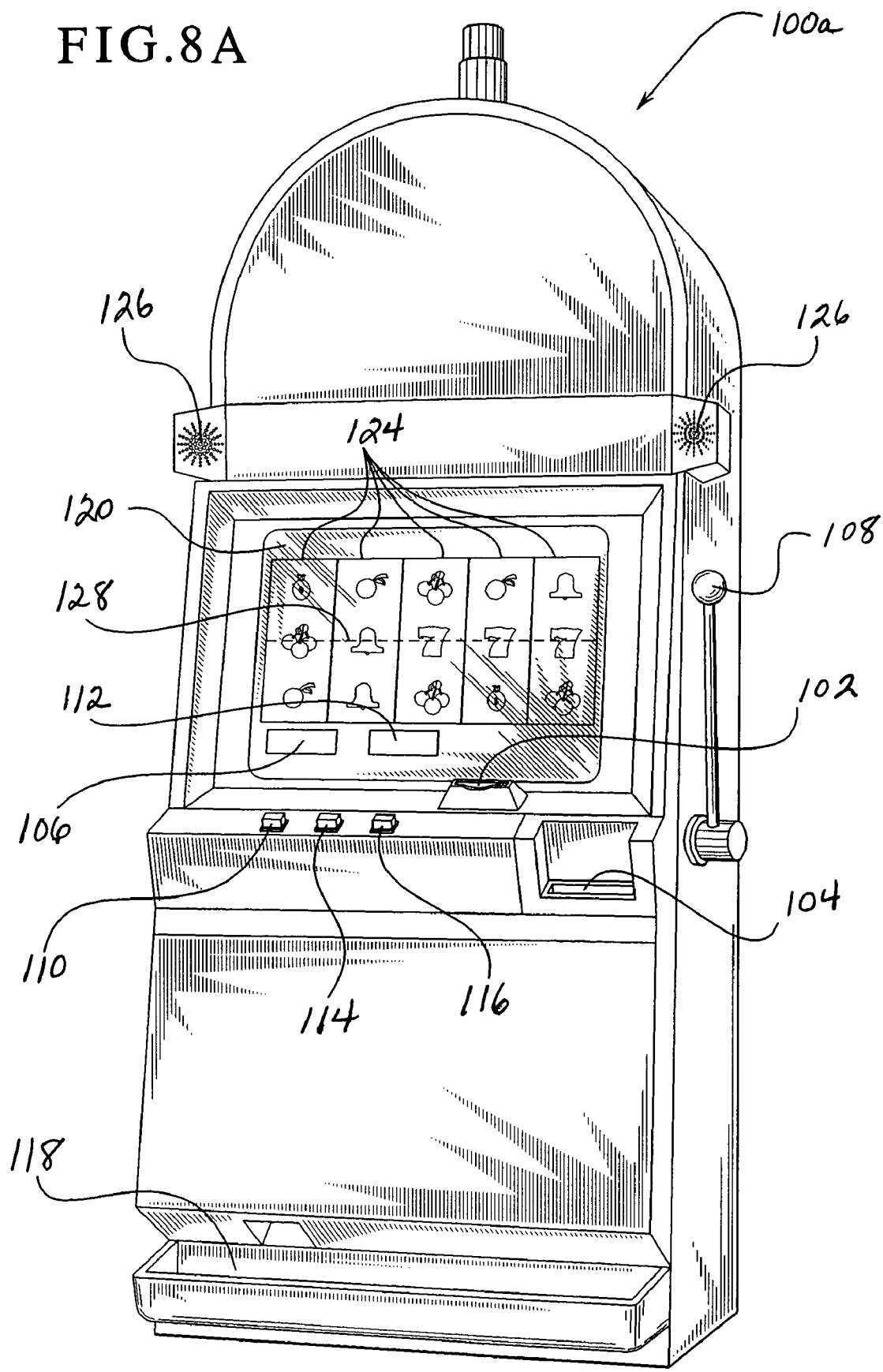
FIG. 8A is a perspective view of the structure of one embodiment of the gaming device of the present invention.
Figure 8B:
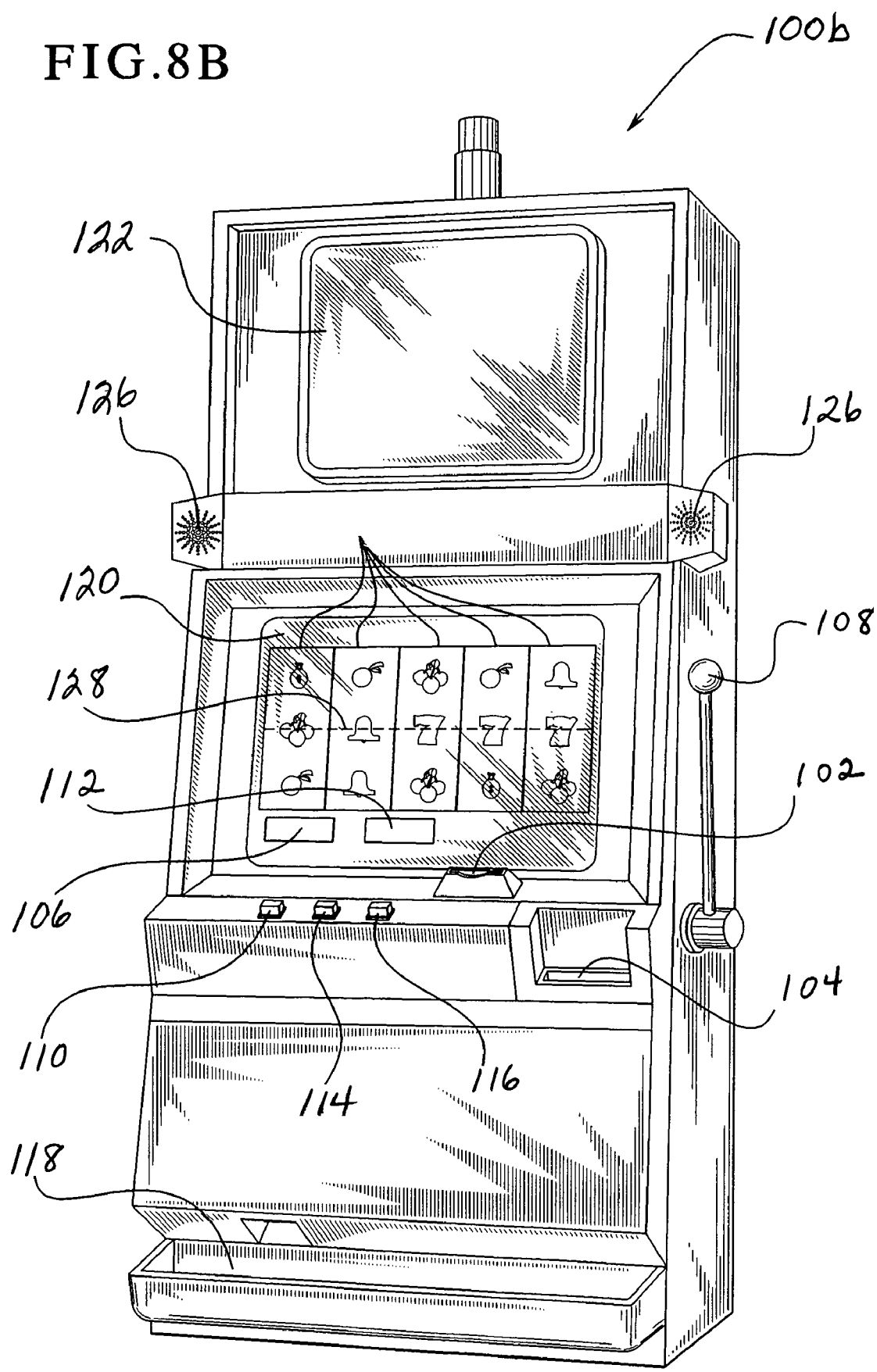
FIG. 8B is a perspective view of the structure of another embodiment of the gaming device of the present invention.

Two embodiments of a gaming device are illustrated in FIGS. 8A and 8B as gaming device 100*a* and gaming device 100*b*, respectively. Gaming device 100*a* and/or gaming device 100*b* are generally referred to herein as gaming device 100. Gaming device 100 is a gaming machine having the controls, displays and features of a conventional gaming machine. It is constructed so that a player can operate it while standing or sitting, and gaming device 100 is preferably mounted on a console or in a cabinet. However, it should be appreciated that gaming device 100 can be constructed as a pub-style table-top game (not shown) which a player can operate preferably while sitting. Furthermore, gaming device 100 can be constructed with varying cabinet and display designs, as illustrated by the designs shown in FIGS. 8A and 8B. Gaming device 100 can also be implemented as a program code stored in a detachable cartridge for operating a hand-held gaming device. Also, gaming device 100 can be implemented as a program code stored on a disk or other memory device which a player can use in a desktop or laptop personal computer or other suitable computerized platform.

Gaming device 100 can incorporate any primary game such as slot, poker, blackjack or keno, any of their bonus triggering events and any of their bonus round games. The symbols and indicia used on and in gaming device 100 may be in mechanical, electrical or video form.

As illustrated in FIGS. 8A and 8B, gaming device 100 includes a coin slot 102 and bill acceptor 104 where the player inserts money, coins or tokens. The player can place coins in the coin slot 102 or paper money or ticket vouchers in the bill acceptor 104. Other devices could be used for accepting payment such as readers or validators for credit cards or debit cards. When a player inserts money in gaming device 100, a number of credits corresponding to the amount deposited is shown in a credit display 106. After depositing the appropriate amount of money, a player can begin the game by pulling arm 108 or pushing play button 110. Play button 110 can be any play activator used by the player which starts any game or sequence of events in the gaming device.

As shown in FIGS. 8A and 8B, gaming device 100 also includes a bet display 112 and a bet one button 114. The player places a bet by pushing the bet one button 114. The player can increase the bet by one credit each time the player pushes the bet one button 114. When the player pushes the bet one button 114, the number of credits shown in the credit display 106 decreases by one, and the number of credits shown in the bet display 112 increases by one.

A player may cash out and thereby receive a number of coins corresponding to the number of remaining credits by pushing a cash out button 116. When the player cashes out, the player receives the coins in a coin payout tray 118. The gaming device 100 may employ other payout mechanisms such as credit slips redeemable by a cashier or electronically recordable cards which keep track of the player's credits.

Gaming device 100 also includes one or more display devices. The embodiment shown in FIG. 8A includes a central display device 120, and the alternative embodiment shown in FIG. 8B includes a central display device 120 as well as an upper display device 122. Gaming device 100 displays in one embodiment a plurality of reels 124 such as three to five reels 124 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 124 are in video form, the display device for the video reels 124 is preferably a video monitor.

Each reel 124 displays a plurality of indicia such as bells, hearts, fruits, numbers, letters, bars or other images which preferably correspond to a theme associated with the gaming device 100. Furthermore, gaming device 100 preferably includes speakers 126 for making sounds or playing music.

To operate the gaming device 100 in one embodiment the player must insert the appropriate amount of money or tokens at coin slot 102 or bill acceptor 104 and then pull the arm 108 or push the play button 110. The reels 124 will then begin to spin. Eventually, the reels 124 will come to a stop. As long as the player has credits remaining, the player can spin the reels 124 again. Depending upon where the reels 124 stop, the player may or may not win additional credits.

In addition to winning credits in this manner, the gaming device 100 may also give players the opportunity to win credits in a bonus round. This type of gaming device 100 will include a program which will automatically begin a bonus round when the player has achieved a qualifying condition in the game. This qualifying condition can be a particular arrangement of indicia on a display device. The gaming device 100 may use a video-based central display device 120 to enable the player to play the bonus round. The qualifying condition may be a predetermined combination of indicia appearing on a plurality of reels 124. As illustrated in the five reel slot game shown in FIGS. 8A and 8B, the qualifying condition could be the number seven appearing on three adjacent reels 124 along a payline 128. It should be appreciated that the present invention can include one or more paylines, such as payline 128, wherein the paylines can be horizontal, diagonal or any combination thereof.

The gaming device of the present invention can operate games which are written in code which is not native to, specific to or otherwise compatible with the platform of the gaming device. The gaming device includes a converter program or virtual machine which serves as an interface between platform-independent code and the gaming device platform. The converter program changes the platform-independent code into a format which can be read by the gaming device processor which operates on the gaming device platform. In one embodiment, certain platform-independent code is isolated from certain platform-dependent code, enabling developers to perform research and design on specific categories of code on a platform which is different than the gaming device platform. Software development tools or programs are commercially available for wide-spread platforms (such as the platforms sold under the trademarks WINDOWS™, MACINTOSH™, SOLARIS™ and LINUX™) but are generally not commercially available for gaming device platforms, which are typically proprietary. The gaming device of the present invention therefore is especially helpful to developers and will facilitate the development of more advanced, exciting and entertaining games for gaming devices.

The platform or operating system sold under the SOLARIS™ trademark, has a windowing system that enables multithreading, symmetric multiprocessing (SMP), integrated TCP/IP networking and centralized network administration.

The platform or operating system sold under the LINUX™ trademark, has a freely-distributed open source operating system that runs on a number of hardware platforms. Because this operating system is free, and because it runs on different computer platforms, this operating system us usable as an alternative to proprietary operating systems.

The platform or operating system sold under the trademark MACINTOSH™, has a graphical user interface (GUI) that utilizes windows, icons, and a mouse to make it relatively convenient for novices to use the computer productively. Rather than learning a complex set of commands, the user can operate a computer with this operating system by pointing to a selection on a menu and clicking a mouse button. The GUI is embedded into this operating system which means that all applications that run on a compatible computer have a similar user interface.

The platform or operating system sold under the trademark MICROSOFT WINDOWS™, is a family of operating systems for personal computers. This family of operating systems, adopted by much of the personal computer world, provides a graphical user interface (GUI), virtual memory management, multitasking and support for many peripheral devices.

The platform or operating system sold under the trademark MACINTOSH™, has a graphical user interface (GUI) that utilizes windows, icons, and a mouse to make it relatively convenient for novices to use the computer productively. Rather than learning a complex set of commands, the user can operate a computer with this operating system by pointing to a selection on a menu and clicking a mouse button. The GUI is embedded into this operating system which means that all applications that run on a compatible computer have a similar user interface.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:
   a processor associated with a first platform type, the processor configured to execute a program having a first program format on a first platform type; and
   a memory device accessible by the processor, the memory device storing:
   (1) game code having a platform independent format, the game code:
      (a) having been written in a second different program format for a second platform type, the second different program format not being executable by said processor,
      (b) having been converted from said second different program format into said platform independent format,
      (c) representing a wagering game associated with a plurality of elements including at least one audio output element independent of any audio hardware of any particular platform type and at least one visual output element independent of any video hardware of any particular platform type, and
      (d) including an instruction call associated with a game event, and
   (2) conversion code having a platform independent format, the conversion code being isolated from the game code;
   the conversion code being executable by the processor to convert the game code to converted game code having the first program format, the conversion converting the at least one audio output element to at least one converted audio output element based on audio hardware particular to the first platform type and converting the at least one video output element to at least one converted video output element based on video hardware particular to the first platform type; and
   the converted game code being directly executable by the processor to:
      (a) enable a player to wager on a play of the wagering game,
      (b) control a plurality of the elements associated with the wagering game,
      (c) determine whether the game event occurs,
      (d) if the determination is that the game event occurs, execute the instruction call as a result of the occurrence of the game event,
      (e) cause the at least converted one audio output element to be played using the audio hardware particular to the first platform type,
      (f) cause the at least one converted video output element to be displayed using the video hardware particular to the first platform type, and
      (g) if the play of the wagering game results in a winning outcome, provide an award to the player, the award being based on the wager for said play.

2. The gaming device of claim 1, wherein the converted game code is incompatible with the second platform type.

3. The gaming device of claim 1, wherein the second platform type corresponds to a plurality of different types of computer platforms.

4. The gaming device of claim 1, wherein the memory device stores data associated with both: (a) the first program format; and (b) the platform independent format.

5. The gaming device of claim 1, wherein the conversion code includes at least one selected from the group consisting of: sound code associated with the at least one audio output element, graphics code associated with the at least one visual output element, and paytable code associated with a payout element.

6. A gaming device comprising:
   a processor configured to control a wagering game associated with a plurality of elements including at least one converted audio output element and at least one converted visual output element, the processor associated with a first platform type and configured to execute code of a first program format which is compatible with said first platform type; and
   a memory device accessible by the processor, said memory device storing:
   (1) game code having a platform independent format, the game code being associated with the wagering game, the game code:
      (a) having been written in a second program format for a second platform type, the second program format not being executable by the processor,
      (b) having been converted from said second program format into said platform independent format, and
      (c) including an instruction call associated with a game event of the wagering game;
   (2) conversion code having a platform independent format, the conversion code being an isolated software module separate from the game code, the conversion code including at least one selected from the group consisting of: sound code, graphics code, and paytable code,
   the conversion code being executable by the processor to convert the game code having the platform independent format to converted game code having the first program format; and
   the converted game code being directly executable by the processor to:
      (a) enable a player to wager on a play of the wagering game,
      (b) control a plurality of the elements associated with the wagering game,
      (c) determine whether the game event occurs,
      (d) execute the instruction call as a result of the occurrence of the game event,
      (e) cause the at least one converted audio output to be played using the audio hardware of the first platform type,
      (f) cause the at least one converted video output to be played using the video hardware of the first platform type, (g) if the play of the wagering game results in a winning outcome, provide an award to the player, the award based on the wager for said play.

7. The gaming device of claim 6, wherein the converted game code is incompatible with the second platform type.

8. The gaming device of claim 6, wherein the second platform type corresponds to a plurality of different types of computer platforms.

9. The gaming device of claim 6, wherein the memory device stores data associated with both: (a) the first platform type; and (b) the second platform type.

10. The gaming device of claim 6, wherein the game code includes code selected from the group consisting of sound code, graphics code, and paytable code.

11. A gaming device comprising:
   a processor configured to execute a program having a gaming device program format associated with a gaming device platform; and
   a memory device accessible by the processor, the memory device storing:
   (1) game code having a platform independent format different from the gaming device program format, the game code:
      (a) having been written in a second program format for a different platform type, the second program format different from the gaming device program format and not executable by the processor,
      (b) having been converted from the second program format into said platform independent format,
      (c) representing a wagering game associated with a plurality of elements including at least one audio output element independent of any audio hardware of any particular platform type and at least one visual output element independent of any video hardware of any particular platform type, and
      (d) including an instruction call associated with a game event; and
   (2) conversion code having a platform independent format, the conversion code being an isolated software module separate from the game code
   the conversion code being executable by the processor to convert the game code having the platform independent format to converted game code having the first program format, the conversion converting the at least one audio output element to at least one converted audio output element based on audio hardware particular to the first platform type and converting the at least one video output element to at least one converted video output element based on video hardware particular to the first platform type; and
   the converted game code being directly executable by the processor to:
      (a) enable a player to wager on a play of the wagering game,
      (b) control at least one of the elements of the wagering game;
      (c) determine whether the game event occurs,
      (d) execute the instruction call as a result of the occurrence of the game event,
      (e) cause the at least one converted audio output to be played on the audio hardware particular to the first platform type,
      (f) cause the at least one converted video output to be displayed on the video hardware particular to the first platform type, and
      (g) if the play of the wagering game results in a winning outcome, provide an award to the player, the award being based on the wager for said play.

12. The gaming device of claim 11, wherein the conversion code includes data corresponding to both the gaming device platform and the different platform type.

13. A gaming device comprising:
   a processor configured to execute a program having a gaming device program format associated with a gaming device platform; and
   a memory device accessible by the processor, the memory device storing:
   (1) game code having a platform independent format different from the gaming device program format, the game code:
      (a) having been written in a second program format for a different platform type, the second program format different from the gaming device program format and not executable by the processor,
      (b) having been converted from the second program format into said platform independent format,
      (c) representing a wagering game associated with a plurality of elements including at least one audio output element independent of any audio hardware of any particular platform type and at least one visual output element independent of any video hardware of any particular platform type, and
      (d) including an instruction call associated with a game event; and
   (2) conversion code having a platform independent format, the conversion code being an isolated software module separate from the game code;
   the conversion code being executable by the processor to convert the game code having the platform independent format to one of:
      (a) converted game code having the first program format, the conversion to converted game code having the first program format converting the at least one audio output element to at least one converted audio output element based on audio hardware particular to the first platform type and converting the at least one video output element to at least one converted video output element based on video hardware particular to the first platform type, and
      (b) converted game code having a different third program format, the conversion to converted game code having the third program format converting the at least one audio output element to the at least one converted audio output element based on audio hardware particular to the third platform type and converting the at least one video output element to the at least one converted video output element based on video hardware particular to the third platform type; and
   if the conversion code is executed by the processor to convert the game code into converted game code having the first platform format, the converted game code being directly executable by the processor to:
      (a) enable a player to wager on a play of the wagering game,
      (b) control at least one of the elements associated with the wagering game,
      (c) determine whether the game event occurs,
      (d) execute the instruction call as a result of the occurrence of the game event, (e) cause the at least one converted audio output element to be played on the audio hardware particular to the first platform type, (f) cause the at least one converted video output element to be displayed on the video hardware particular to the first platform type, and (g) if the play of the wagering game results in a winning outcome, provide an award to the player, the award being based on the wager for said play.

14. The gaming device of claim 13, wherein the converted code includes code selected from the group consisting of sound code associated with the audio output element, graphics code associated with the visual output element, and paytable code associated with at least one payout.

15. A gaming device comprising:

a processor configured to execute a program having a native format associated with a platform; and at least one memory device accessible by the processor, the memory device storing:

(1) game code having a platform independent format different from the native format, the game code:

(a) having been written in a second program format for a different platform type, the second program format different from the native format and not executable by the processor, (b) having been changed from the second program format into said platform independent format, (c) representing a wagering game associated with a plurality of elements including at least one audio output element independent of any audio hardware of any particular platform and at least one visual output element independent of any video hardware of any particular platform, and (d) including an instruction call associated with a game event;

(2) conversion code having a platform independent format, the conversion code being an isolated software module separate from the game code;

the conversion code being executable by the processor to change the game code having the platform independent format to converted game code having the first program format, the conversion converting the at least one audio output element to at least one converted audio output element based on audio hardware particular to the first platform type and converting the at least one video output element to at least one converted video output element based on video hardware particular to the first platform type;

the converted game code being directly executable by the processor to:

(a) enable a player to wager on a play of the wagering game, (b) control at least one of the elements associated with the wagering game, (c) determine whether the game event occurs, (d) execute the instruction call as a result of the occurrence of the game event, (e) cause the at least one converted audio output element to be played on the audio hardware particular to the first platform type execute the converted code as a result of the execution of the instruction call, (f) cause the at least one converted video output element to be displayed on the video hardware particular to the first platform type, and (g) if the play of the wagering game results in a winning outcome, provide an award to the player, the award being based on the wager for said play.

16. The gaming device of claim 15, wherein the conversion code including compiler code.

17. The gaming device of claim 15, wherein the conversion code includes translator code.

18. The gaming device of claim 15, wherein the conversion code includes converter code.

19. A method of developing game code of a wagering game provided by a gaming device, said method comprising the steps of:

(a) storing game code, said game code:

(i) executable on a first platform type, (ii) having a first program format associated with the first platform type, and (iii) executable on the first platform type to implement the wagering game, the wagering game associated with a plurality of elements including at least one visual output element and at least one audio output element;

(b) converting the game code from the first program format to intermediate game code having a platform independent format, the converted game code including at least one selected from the group consisting of: sound code, graphics code, and paytable code;

(c) storing the intermediate game code on a memory device of the gaming device, the gaming device having a second platform type;

(d) causing a gaming device processor of the gaming device to convert the intermediate game code from the platform independent format to converted game code having a second program format executable by the gaming device processor; and (e) executing the converted game code to:

(i) enable a player to wager on a play of the wagering game, (ii) control a plurality of the elements associated with the play of the wagering game, (iii) evaluate at least one of the controlled elements, and (iv) modify the converted game code based on the evaluation.

20. The method of claim 19, wherein storing the game code includes writing source code and compiling the source code into the game code.

21. The method of claim 19, wherein converting the intermediate game code from the platform independent format to the converted game code includes compiling the intermediate game code.

22. The method of claim 19, which includes loading the intermediate game code onto a memory device of the gaming device.

23. The method of claim 22, which includes evaluating each of any controlled elements.

24. The method of claim 20, the game code being at least one selected from the group consisting of: sound code associated with the audio output element, graphics code associated with the visual output element, and paytable code associated with at least one payout element.

25. The method of claim 20, which includes writing the source code using a personal computer.

* * * * *

UNITED STATES PATENT AND TRADEMARK OFFICE
CERTIFICATE OF CORRECTION

| | | |
|---|---|---|
| PATENT NO. | : 7,901,291 B2 | |
| APPLICATION NO. | : 10/255380 | |
| DATED | : March 8, 2011 | |
| INVENTOR(S) | : Hecht et al. | |

It is certified that error appears in the above-identified patent and that said Letters Patent is hereby corrected as shown below:

In Claim 1, Column 11, Line 23, replace "a first platform type" with --the first platform type--.

Signed and Sealed this
Seventh Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,901,291 B2 | Page 1 of 1 |
| APPLICATION NO. | : 10/255380 | |
| DATED | : March 8, 2011 | |
| INVENTOR(S) | : Hecht et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1823 days.

Signed and Sealed this
Fourteenth Day of June, 2011

David J. Kappos
*Director of the United States Patent and Trademark Office*